United States Patent
Finn et al.

(10) Patent No.: US 9,955,521 B2
(45) Date of Patent: *Apr. 24, 2018

(54) DEVICE CONNECTIVITY

(71) Applicant: International Business Machines Corporation, Armonk, NY (US)

(72) Inventors: Russell P. Finn, Winchester (GB); Peter Griffin, Southsea (GB); Stephen Hurst, Hampshire (GB); Sarah E. Jackson, Hursley (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/298,174

(22) Filed: Oct. 19, 2016

(65) Prior Publication Data

US 2017/0041979 A1 Feb. 9, 2017

Related U.S. Application Data

(63) Continuation of application No. 14/751,019, filed on Jun. 25, 2015, now Pat. No. 9,495,085.

(30) Foreign Application Priority Data

Jul. 24, 2014 (GB) .................................. 1413137.9

(51) Int. Cl.
*H04W 76/02* (2009.01)
*G06F 3/0484* (2013.01)
(Continued)

(52) U.S. Cl.
CPC ........ *H04W 76/028* (2013.01); *G06F 3/0484* (2013.01); *H04L 43/0811* (2013.01);
(Continued)

(58) Field of Classification Search
CPC ..................................................... H04W 76/02
See application file for complete search history.

(56) References Cited

U.S. PATENT DOCUMENTS 7,474,615 B2 1/2009 Pirzada et al.
8,463,935 B2 6/2013 Vange et al.
(Continued)

FOREIGN PATENT DOCUMENTS

WO WO0180515 A2 10/2001

OTHER PUBLICATIONS

Tirpak, "A Knowledge Mining Approach to Dynamic Resource Prioritization in a Communication Network," Motorola Inc., ip.com Disclosure No. IPCOM000173690D, Aug. 20, 2008, 5 pages.
(Continued)

*Primary Examiner* — Michael T Vu
(74) *Attorney, Agent, or Firm* — Yee & Associates, P.C.; Richard A. Wilhelm

(57) ABSTRACT

A method of operating a device comprising connecting to an external data source via a network, determining that the network connection has been broken, determining that the network connection has been restored, detecting that a user is accessing an application that requires access to the network connection, and prioritizing the accessed application with respect to the required access to the network connection.

12 Claims, 6 Drawing Sheets

(51) Int. Cl.
*H04L 12/26* (2006.01)
*H04L 12/859* (2013.01)
*H04L 29/08* (2006.01)
*H04W 4/02* (2018.01)

(52) U.S. Cl.
CPC ........ *H04L 47/2475* (2013.01); *H04L 67/145* (2013.01); *H04L 67/322* (2013.01); *H04W 4/02* (2013.01)

(56) References Cited

U.S. PATENT DOCUMENTS

| | | |
|---|---|---|
| 2002/0019879 A1 | 2/2002 | Jasen et al. |
| 2008/0089237 A1 | 4/2008 | Molen et al. |
| 2009/0122699 A1 | 5/2009 | Alperovitch et al. |
| 2013/0100955 A1 | 4/2013 | Dunlap et al. |
| 2013/0121311 A1* | 5/2013 | Shen ................ H04W 36/14 370/331 |
| 2014/0123151 A1* | 5/2014 | Kishan ................ G06F 9/4881 718/103 |
| 2014/0185469 A1 | 7/2014 | Marmolejo-Mellion et al. |
| 2016/0029203 A1 | 1/2016 | Finn et al. |

OTHER PUBLICATIONS

Office Action, dated Mar. 11, 2016, regarding U.S. Appl. No. 14/751,019, 14 pages.
Notice of Allowance, dated Jul. 20, 2016, regarding U.S. Appl. No. 14/751,019, 11 pages.

* cited by examiner

DEVICE CONNECTIVITY

CROSS-REFERENCE TO RELATED APPLICATIONS

This application is a continuation of and claims the benefit of priority to U.S. patent application Ser. No. 14/751,019, filed Jun. 25, 2015, which claims the benefit of priority to United Kingdom Patent Application No. GB 1413137.9, filed Jul. 24, 2014. The entire contents of both aforementioned applications are incorporated herein by reference.

FIELD OF THE INVENTION

This invention relates to a method of operating a device and to the device itself.

BACKGROUND

A data connection for a mobile device (for example a smartphone or tablet) is not always available due to a lack of signal. A user of the device may need to accomplish a specific task, such as navigation or a web search, and then discover that they do not have a data connection and so have to relocate in order to get a usable signal. On obtaining a signal however, it is often the case that multiple applications on the mobile device will compete to use the available bandwidth. This results in the foreground application that the user cares about exhibiting slower response times as bandwidth is consumed by the background applications. In practical terms, the background applications are not immediately important to the user and interfere with the user's ability to accomplish their task in relation to the desired foreground application. Indeed it is also true that the longer the data connection outage has been, the more exacerbated the problem becomes because more background applications will have outstanding tasks, and those tasks are likely to be larger in size and the demands on the bandwidth are much greater.

A known solution to this problem comprises switching off any background synchronisation manually per application before the network connection is restored. This could work for some users who sufficiently understand the technology, but requires the mobile device's operating system and/or applications to allow this level of control. It is also true that in this case, the user needs to be aware that there has been a connection outage in the first instance, which may not always be the case. Even if the user is a knowledgeable user, and the device is capable, this is still an inconvenient and manual solution that is not desirable for the vast majority of users.

BRIEF SUMMARY OF THE INVENTION

According to a first aspect of the present invention, there is provided a method of operating a device comprising connecting to an external data source via a network, determining that the network connection has been broken, determining that the network connection has been restored, detecting that a user is accessing an application that requires access to the network connection, and prioritizing the accessed application with respect to the required access to the network connection.

According to a second aspect of the present invention, there is provided a device comprising a user interface arranged to receive input from a user, a network interface arranged to connect to an external data source via a network, and a processor connected to the user interface and the network interface and arranged to determine that the network connection has been broken, determine that the network connection has been restored, detect that a user is accessing an application that requires access to the network connection, and prioritize the accessed application with respect to the required access to the network connection.

According to a third aspect of the present invention, there is provided a computer program product on a computer readable medium for operating a device, the product comprising instructions for connecting to an external data source via a network, determining that the network connection has been broken, determining that the network connection has been restored, detecting that a user is accessing an application that requires access to the network connection, and prioritizing the accessed application with respect to the required access to the network connection.

Owing to the invention, it is possible to provide a device that will prioritize network traffic, after a loss of connection, in order to meet the network connection needs of the user, without requiring any intervention from the user. The invention introduces a method which enables a device to perform data traffic prioritization after detecting that there has been a data connection outage. This allows the user to achieve a desired task more quickly (for example downloading a map to their device) without having their experience impaired by other applications on the device (for example social networking and email) competing for the available bandwidth. The prioritization is achieved by the device constantly monitoring the state of the connection to the data network and detecting when there has been a loss of signal and when that signal has been restored.

Preferably, when the signal is lost, a counter is started, counting the time until a signal is re-established. If sufficient time has elapsed and the user tries to perform a task on their device, then most or all of the available bandwidth will be diverted to the application that is running in the foreground, allowing for optimum completion of the user's desired task. The device remains in this mode until the user has completed their task(s), at which point normal device operation would resume. Task completion could be identified by the device screen being switched off, or any other trigger(s) that identify task completion. This is an improvement on the existing situation because the change of mode occurs automatically and does not rely on the user hunting through their phone's configuration for individual application settings. This is a seamless improvement that benefits all users.

Advantageously, the step of prioritizing the accessed application with respect to the required access to the network connection comprises reserving a percentage of the available bandwidth for the accessed application. The device, once it has determined that there has been a break in the network connection, will prioritize the user's foreground application that the user is currently trying to access. This prioritization could mean that all of the available bandwidth is assigned to the user's application, but it could also mean that a specific percentage of the bandwidth is used, for example 80% of the available bandwidth, as a preferable embodiment. This will ensure that the user has access to the vast majority of the available bandwidth for their current application, but will also mean that the background applications that are trying to use the network connection can also have access to the available bandwidth. This provides the user with a good balance between completing their current task, which is probably important to them, while also allowing the connection of services such as messaging and email, which may result in important messages being delivered to the user. The user would, of course, be unaware of their existence, so the operation of some background tasks on a reduced bandwidth is probably desirable for the user, in many situations. The percentage reserved could be a predetermined percentage or could be calculated from current parameters.

Ideally, the method further comprises comparing the location of the device when determining that the network connection has been broken to the location of the device when determining that the network connection has been restored and prioritizing the accessed application with respect to the required access to the network connection if the two locations differ. The device can record the location of the device when the foreground application attempted to use the network and the network was determined to be unavailable. Once the connection has been restored the device can then compare the current location with the previously recorded location, and if the two differ then there is increased confidence that the user has relocated to seek a connection which means that foreground prioritization is required.

BRIEF DESCRIPTION OF THE DRAWINGS

Preferred embodiments of the present invention will now be described, by way of example only, with reference to the following drawings, in which.

DETAILED DESCRIPTION OF THE DRAWINGS

Figure 1:
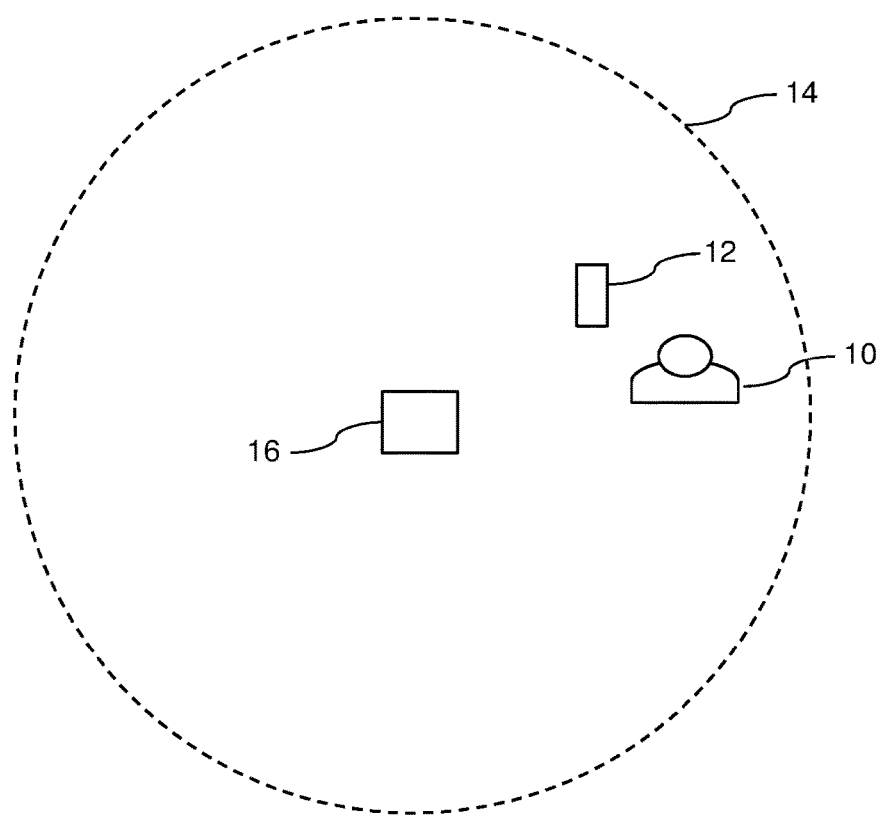
FIG. 1 is a schematic diagram of a user with a mobile device.

FIG. 1 illustrates a user 10 with a mobile device 12, who is on the edge of coverage 14 of a base station 16. The device 12 could be a smartphone which connects through a 3G network to the Internet and to other mobile phone users. The device 12 is configured in such a way that it has a specific operating mode that is entered into once the device 12 has no signal connection to the 3G network. As the user 10 moves about with their mobile device 12, then there will be times when there is no signal coverage 14, an event which is well known to mobile phone users, particularly in remote areas.

The primary sequence of events starts from the assumption that the device 12 has a data connection and is syncing normally. Once the data connection is lost then the device's operating system (O/S) detects that the network connection has been broken. The duration of the data outage is monitored and once a threshold has been passed (and potentially other criteria, which are described in more detail below) the device 12 enters a mode where it will give foreground applications data priority once a data connection is re-established. This may have resulted for example from the user 10 wishing to use their device 10 to accomplish a task that requires a data connection so they relocate to find a signal.

Once a data connection is re-established, with the device 12 in the new mode, the user's foreground application is now given data priority over other applications. This gives the user 10 the best possible experience and lets them accomplish their task as efficiently as possible. The device returns to standard data prioritization after certain criteria are met (see below for more detail). Once the network connection is restored, then the user's foreground application is prioritized with respect to the available bandwidth of the network connection. The foreground application, which is one that the user is accessing, may be assigned the entire available bandwidth or a very large percentage (say 80%) of the available bandwidth.

Example criteria for entering the data prioritizing mode include lack of network (data) availability, which could be sensitive to the duration of the outage (for example a minimum of 30 minutes) and usage of the user's location. In the latter case, by monitoring location services (GPS, wireless IDs, etc.) the device 12 could determine that the user 10 has relocated from an out-of-signal location to a new location with a data connection. This extra information can provide increased confidence that the device 12 should be in the new mode of prioritizing data. Essentially the device 12 enters the new mode when it is determined that the network connection has been restored, after a period when it was unavailable.

Figure 2:
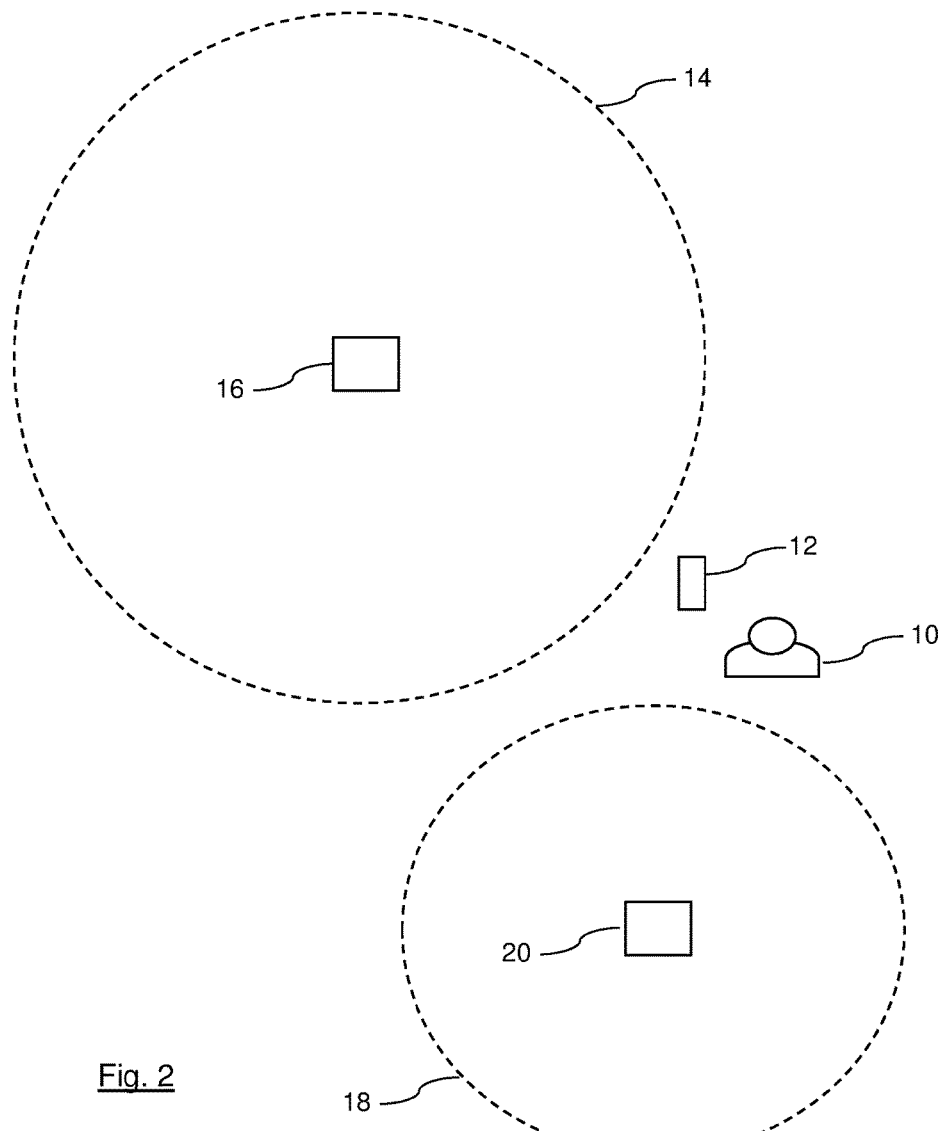
FIG. 2 is a further schematic diagram of a user with a mobile device.

FIG. 2 shows the user 10 having moved out of the coverage 14 for the base station 16 and heading towards the coverage 18 of a second base station 20. In-between the two areas of mobile phone signal coverage 14 and 18 there is no network connection and this will mean that once the user 10 reaches the coverage 18 and network connection is restored, the mobile device 12 will move into the data prioritizing mode, whereby the available bandwidth will be prioritized for the user's foreground application. Once the device 12 is physically in the coverage 18 and network connection is restored, data prioritizing will be used on the device 12.

Example criteria for exiting the data prioritizing mode include the user 10 turning off the device screen, the rate of data traffic used by the foreground application drops to a minimal threshold, time data (either fixed or proportional to the length of the outage), end user cancellation (the device 12 could flag that it has entered the mode and the user 10 could tap to leave the mode) and/or a period of inactivity from the end user 10. The prioritization of the network bandwidth for the user's foreground application will be ended by one or other of these triggers. This ensures that the device 12 is not restricting access to the bandwidth unnecessarily, so that once the mode is exited, background applications will have full access to the bandwidth.

Figure 3:
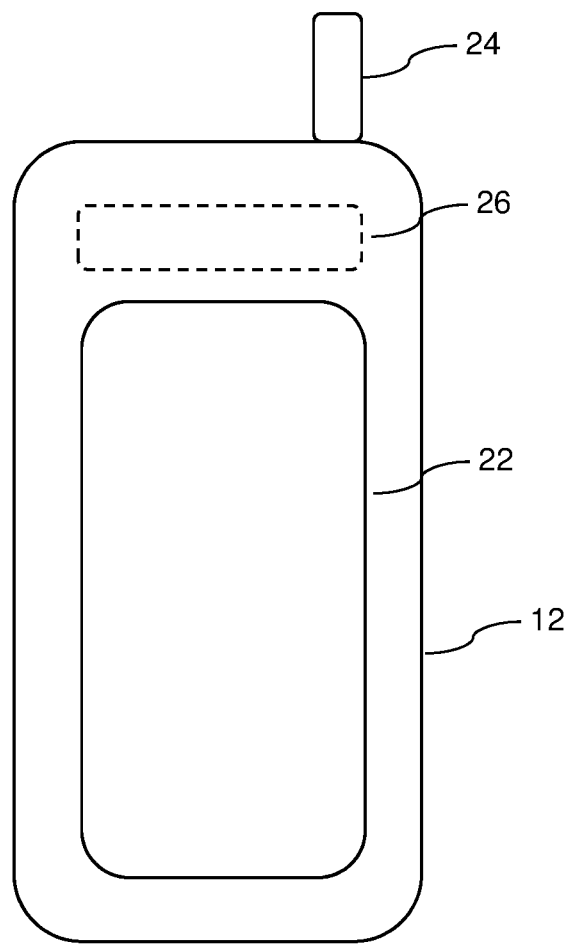
FIG. 3 is a schematic diagram of a mobile device.

FIG. 3 shows the mobile device 12 in more detail. The principal components of the device 12 are a user interface 22 (here a touchscreen), a network interface 24 and a processor 26, which is connected to the user interface 22 and the network interface 24. The processor 26 controls the operation of the device 12 and runs an operating system that executes applications. The user 10 interacts with the device 12 via the touchscreen 22. The device 12 is a modern smartphone that has a high level of computing power and can run applications such as an Internet browser and an email client, applications with which the user 10 can interact.

Some applications run by the processor 26 can be considered as background applications, which mean that they perform tasks that consume processing power and available bandwidth of the network connection in the background, without the user 10 directly interacting with the applications. For example, the email client may periodically poll an email server over the network connection for any new email. If new email is present on the email server, then the email client will download the new email(s). It will be appreciated that if this task has not been performed recently (for example due to the lack of network connection) then there could be a substantial amount of email traffic to download.

A foreground application is an application with which the user 10 is directly interacting, for example, through the user interface 22. The processor 26 is able to identify a foreground application on the basis of the user's direct interaction with the application. The processor 26 is able to distinguish foreground applications from background applications and when the device 12 is in the data prioritization mode, then the available bandwidth is prioritized for the foreground application(s) with which the user 10 is currently interacting. The network connectivity of the background applications is either suspended completely or rationed to a small percentage of the available bandwidth so that the foreground application(s) have priority.

The implementation of a data prioritization mode is not limited to mobile devices. The use of such a mode also applies to any device in a location with potentially limited network bandwidth and/or unreliable connectivity. For example a rural farmer with a dial-up connection, or a slow broadband link following a power cut, flood or any other infrastructure failure. Rather than give the foreground application 100% data priority other profiles may be used, for example an 80%/20% split, or background applications may be given serial access to limited data bandwidth. The foreground application may consist of multiple processes and common services that are all considered to be the application for the purposes of prioritization.

Figure 4:
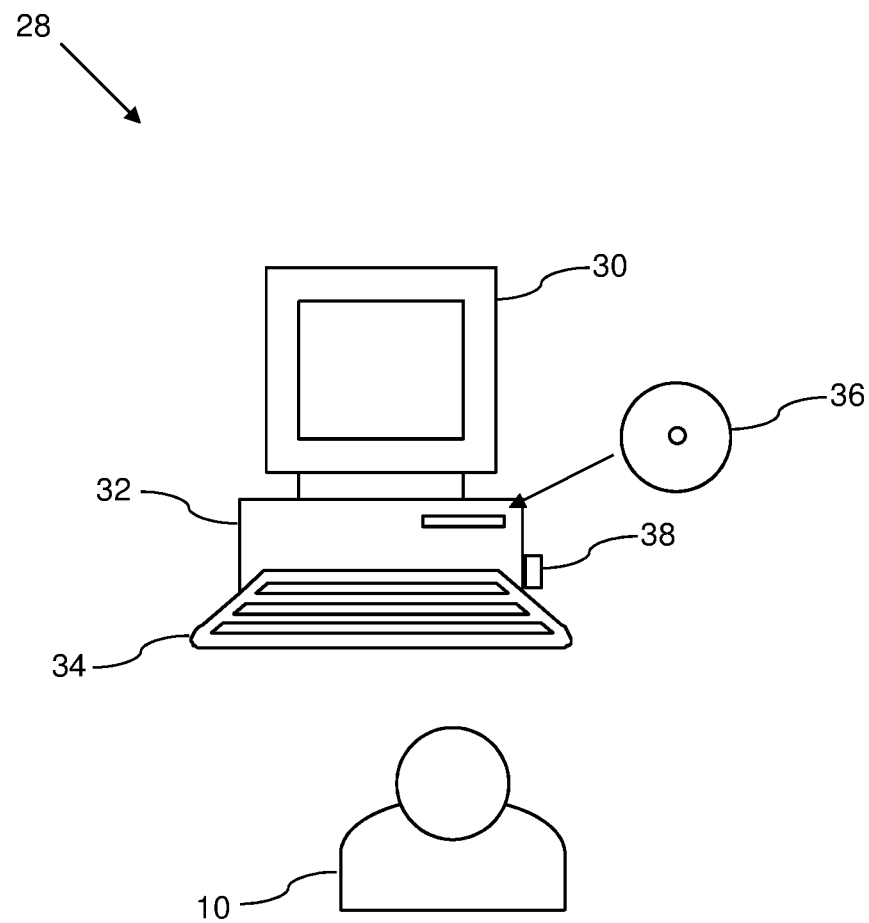
FIG. 4 is a schematic diagram of a computing system.

FIG. 4 shows an example of standard desktop computer 28, with the user 10. The computer 28 comprises a display device 30, a processor 32 and a user input device (a conventional keyboard) 34. The processor 32 is connected to the display device 30 and the user input device 34. The processor 32 is running multiple software applications with which the user 10 can interact via the graphical user interface of each application, which are capable of being displayed by the display device 30. A CD-ROM 36 is shown, which can be used to store a computer program product that can be used to control the processor 32 via the instructions of the program product.

The computer 28 also includes a network interface 38 that is connected to the processor 32 and provides the computer with a connection to external networks, such as the Internet. The computer 28 also operates the data prioritization mode discussed above with respect to the mobile device 12, such that if the connection to the external network is lost, then when that connection is restored the foreground application that the user 10 is accessing will be prioritized in relation to the available bandwidth. Background applications and tasks being run by the computer 28 will either have no bandwidth available or will be restricted to a small percentage of the available bandwidth during the network access prioritization.

Figure 5:
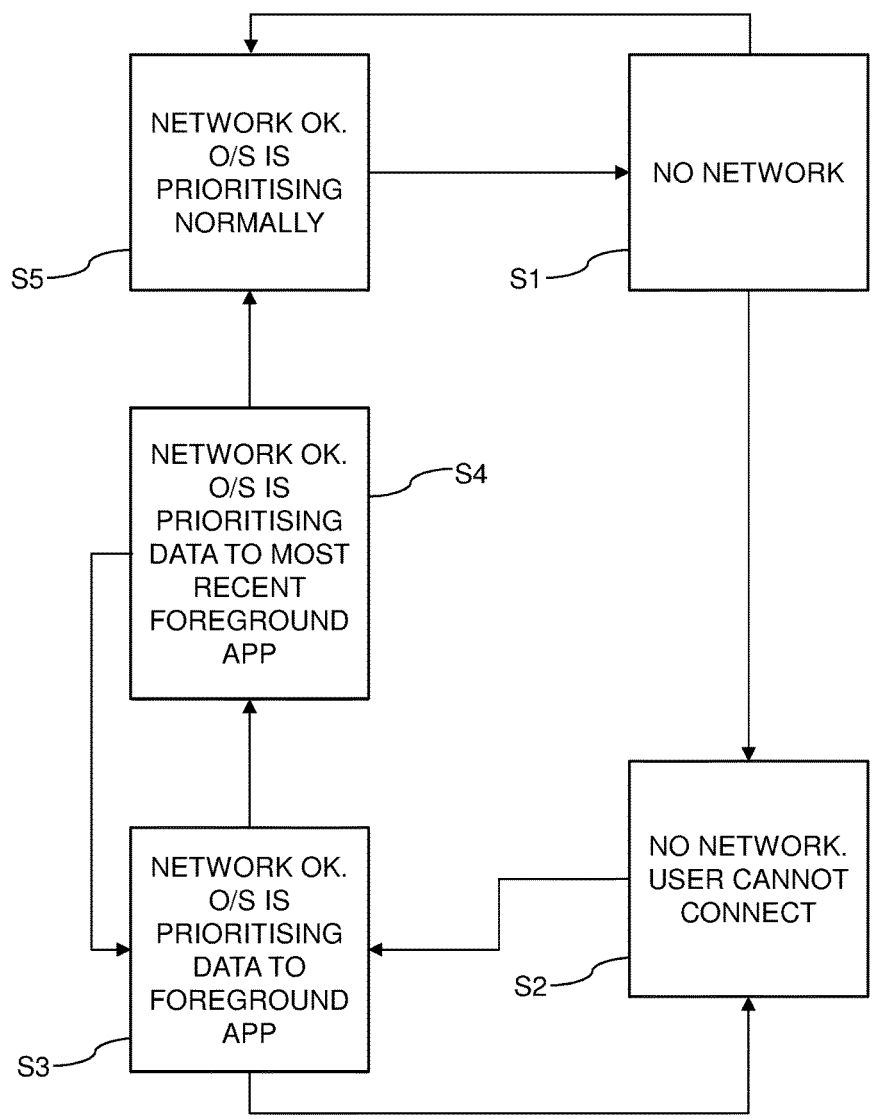
FIG. 5 is a state diagram of device connectivity.

FIG. 5 provides a state diagram illustrating the problem solved by the network prioritization through an example of a user holidaying in remote location. The user is staying in a cottage in a remote location while on holiday in Scotland. The mobile signal in the area is poor, and in the cottage is non-existent—this is illustrated by state S1 in the diagram, where the user has no network access, but does not need it currently. The user needs to go to the nearest town for dinner in the evening and so wants to look up the local bus timetable online—this is state S2 in the diagram, where the user desires network access, but does not have it.

The user heads out to find a signal and at the top of a local hill their phone is able to obtain a signal which provides a slow data connection, which while not ideal is nevertheless good enough to look up bus times. The user opens a browser on their phone to find the bus times but by this point several other applications on the phone, having been deprived of a data connection for the previous 24 hours, spring into life. These background applications would like to start downloading data, heavily using the limited bandwidth available, but they are prevented from doing so by the network access prioritization, which is state S3 in the diagram. Should connection be lost at this point then the device returns to state S2.

The user can obtain the bus timetable by finding and loading the appropriate web page, followed by downloading the timetable in pdf format. This would be a slow process that would be significantly impacted by the numerous background apps, if these were not limited in their network access (either completely blocked or restricted to a small percentage). Once the user has completed the task, then the device moves to state S4, where it can switch back to state S3 if the user starts to use another foreground app. Once the device has been in state S4 for a specific length of time, say five minutes, then it will move to state S5, where essentially all network access is handled normally with no prioritization. If data connection is lost again, then the device moves to state S1 (and returns to state S5 is the connection is restored).

Figure 6:
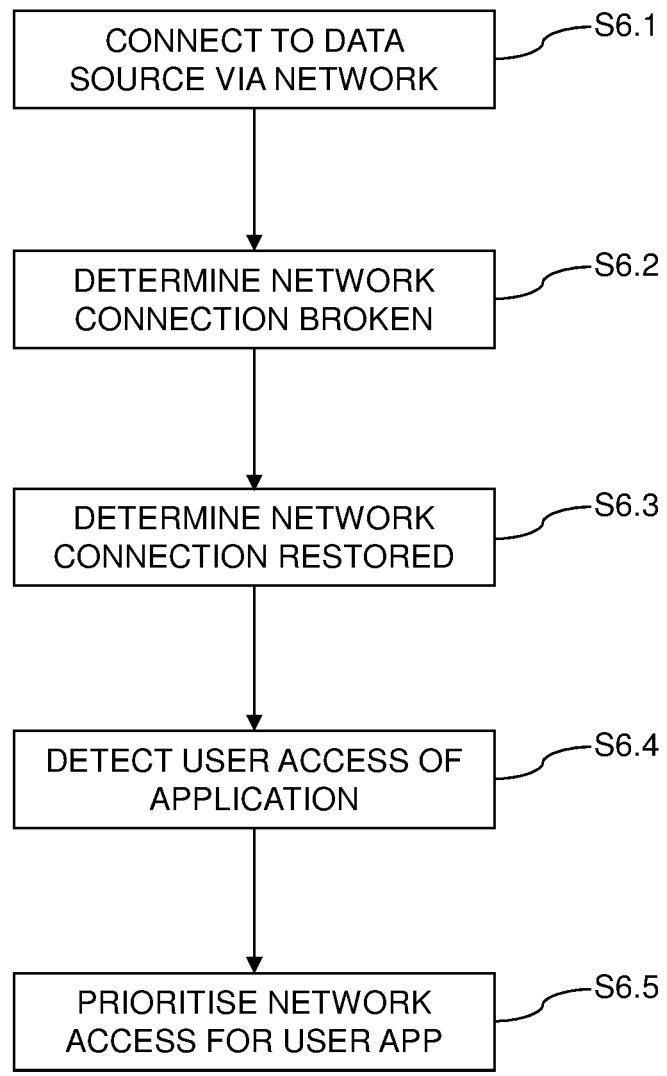
FIG. 6 is a flowchart of a method of operating a device.

FIG. 6 summarizes the method of operating the device. The method comprises the steps of firstly, step S6.1, which comprises connecting to an external data source via a network. The network could be a wireless or wired network, as discussed above. The device has a network connection to the external data source which could be a server running a web service, for example. The network is a data network that supports the bi-directional transfer of the data between the device and the external data source. If the device is a mobile device such as a modern smartphone, then this device can connect to the Internet via the phone's network connection.

The second step, step S6.2, comprises determining that the network connection has been broken and the third step, S6.3, comprises determining that the network connection has been restored. The methodology employed by the device only operates after the network connection has been dropped and is then restored again. The break in the network connection can be monitored for length of time, as it is advisable that short duration breaks are ignored. A threshold can therefore be applied, which requires that the break in the connection be longer than a specific time, such as one minute. In this case, the time lapse between the network connection being broken and the network connection being restored will need to exceed the time limit.

The final two steps of the method comprise, step S6.5, detecting that the user is accessing an application that requires access to the network connection, and step S6.6, which comprises prioritizing the accessed application with respect to the required access to the network connection. Once the device has moved into the data prioritization mode, then any application that the user is currently using (a foreground application) is prioritized over any other application (a background application) with respect to the access to the network connection. All of the bandwidth available (or a very significant proportion, such as 80%) is reserved for the user's foreground application, at the expense of other background applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of operating a device comprising:
   connecting to an external data source via a network;
   determining that the network connection has been broken;
   determining that the network connection has been restored after determining that the network connection has been broken;
   determining that a time lapse between the network connection being broken and the network connection being restored exceeds a time limit;

detecting that a user is accessing an application that requires access to the network connection; and responsive to determining that the network connection has been restored, prioritizing the accessed application with respect to the required access to the network connection.

2. The method according to claim 1, wherein the step of prioritizing the accessed application with respect to the required access to the network connection comprises reserving a percentage of the available bandwidth for the accessed application.

3. The method according to claim 1, and further comprising:

detecting that the user is no longer accessing the application; and responsive to detecting that the user is no longer accessing the application, removing the priority of the accessed application.

4. The method according to claim 1, and further comprising comparing the location of the device when determining that the network connection has been broken to the location of the device when determining that the network connection has been restored and prioritizing the accessed application with respect to the required access to the network connection if the two locations differ.

5. A device comprising:

a user interface arranged to receive input from a user;

a network interface arranged to connect to an external data source via a network; and a processor connected to the user interface and the network interface and arranged to determine that the network connection has been broken, determine that the network connection has been restored after determining that the network connection has been broken, determine that a time lapse between the network connection being broken and the network connection being restored exceeds a time limit, detect that a user is accessing an application that requires access to the network connection, and prioritize the accessed application with respect to the required access to the network connection responsive to determining that the network connection has been restored.

6. The device according to claim 5, wherein the processor is arranged, when prioritizing the accessed application with respect to the required access to the network connection, to reserve a percentage of the available bandwidth for the accessed application.

7. The device according to claim 5, wherein the processor is further arranged to detect that the user is no longer accessing the application, and remove the priority of the accessed application responsive to detecting that the user is no longer accessing the application.

8. The device according to claim 5, wherein the processor is further arranged to compare the location of the device when determining that the network connection has been broken to the location of the device when determining that the network connection has been restored and prioritize the accessed application with respect to the required access to the network connection if the two locations differ.

9. A computer program product comprising computer instructions embodied on a non-transitory computer readable medium and configured for operating a device, the computer instructions comprising instructions for:

connecting to an external data source via a network;

determining that the network connection has been broken;

determining that the network connection has been restored after determining that the network connection has been broken;

determining that a time lapse between the network connection being broken and the network connection being restored exceeds a time limit;

detecting that a user is accessing an application that requires access to the network connection; and responsive to determining that the network connection has been restored, prioritizing the accessed application with respect to the required access to the network connection.

10. The computer program product according to claim 9, wherein the instructions for prioritizing the accessed application with respect to the required access to the network connection comprise instructions for reserving a percentage of the available bandwidth for the accessed application.

11. The computer program product according to claim 9, and further comprising instructions for detecting that the user is no longer accessing the application and removing the priority of the accessed application responsive to detecting that the user is no longer accessing the application.

12. The computer program product according to claim 9, and further comprising instructions for comparing the location of the device when determining that the network connection has been broken to the location of the device when determining that the network connection has been restored and prioritizing the accessed application with respect to the required access to the network connection if the two locations differ.

* * * * *